May 6, 1947. F. R. KELLY 2,420,139
PIPE JOINT
Filed July 8, 1944
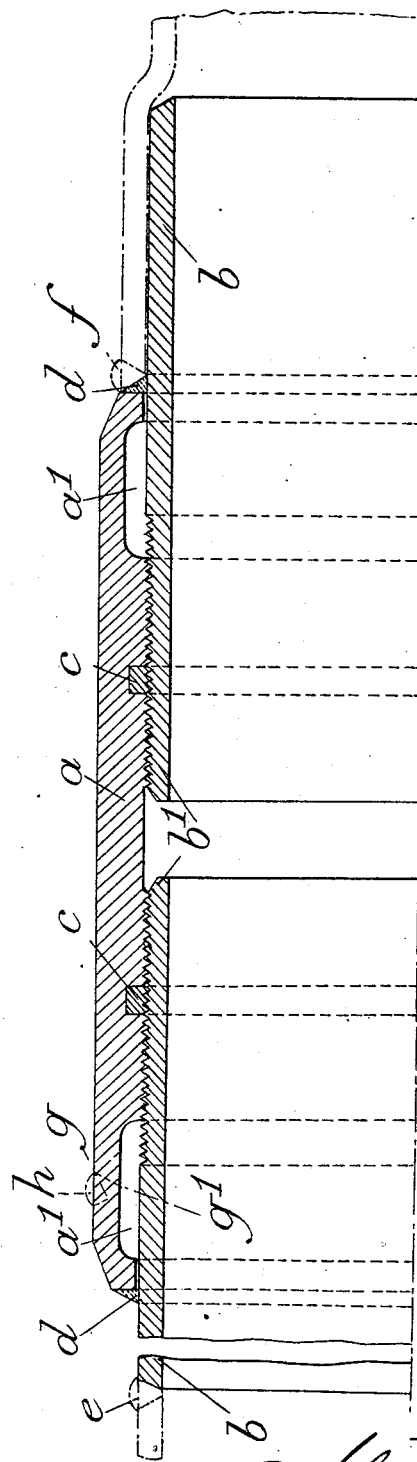
Inventor
F. R. Kelly Patented May 6, 1947

2,420,139

UNITED STATES PATENT OFFICE 2,420,139

PIPE JOINT

Frederick Robert Kelly, Shipston-on-Stour, England, assignor to Iraq Petroleum Company Limited, London, England Application July 8, 1944, Serial No. 543,991
In Great Britain December 30, 1943

5 Claims. (Cl. 285—111)

This invention relates to pipe lines for conveying oil, water, gas, or other fluid with more particular reference to all-welded pipe lines such as are now increasingly coming into use.

Experience has shown that by far the most extensive and deepest areas of corrosion in pipe lines occur on the outside of the bottom of the pipe so that if the pipe could be turned before destructive corrosion has occurred the line could be readily re-conditioned by means of downward welding of pits and the line placed into as good a condition of effectiveness as a new line. With all-welded pipe lines, however, this method cannot at present be adopted unless the pipe be cut, in which case pumping must be stopped with consequent loss of throughput and consequently the less economical and more cumbersome method of patching and sleeving must be resorted to if the throughput is to be maintained.

The object of the present invention is to enable a pipe length to be readily turned for welding or other repair without having to arrest the supply of fluid through the pipe and without any leakage of fluid during the process of repair.

The invention consists in a coupling for adjacent sections of a pipe line comprising two members in fluid-tight contact and one of which may be moved relatively to the other without disturbing the fluid-tight connection, thus permitting one section of the pipe line to be turned relatively to an adjacent length without interrupting the supply through the pipe line and without any loss of fluid therefrom during the turning operation.

The invention also consists in a coupling adapted to be welded into a pipe line comprising a sleeve and an inner length of pipe threaded thereinto, in a fluid-tight manner, the sleeve being recessed internally for a portion of its length so that the reduced portion thus formed may be parted by a suitable cutting tool after which the adjacent pipe length may be turned and the parting in the sleeve subsequently made good by welding.

Further features of the invention will be apparent from the description given hereafter.

The accompanying drawing illustrates in sectional elevation one half of a coupling in accordance with the invention.

In carrying my invention into effect in one convenient manner I form my improved coupling with a sleeve $a$ in each end of which is threaded a length of pipe $b$, a fluid-tight connection between the sleeve and each pipe length being obtained, for example, by lead or other packing washers $c$ arranged in inner recesses in the sleeve, the packing being expanded into the coupling grooves by the operation of forcing the tapered end $b'$ of the inner pipe into the packing in which thread grooves are cut by the operation of screwing the pipe into the sleeve. Any suitable means may be provided within the packing recess to prevent rotation of the packing after its expansion into the recess while the inner sleeve is being screwed through packing.

Towards its outer ends the sleeve $a$ is recessed somewhat as at $a'$ so as to provide a portion of reduced thickness for a purpose hereinafter referred to, and at its outer ends the sleeve is welded to the pipe lengths inserted therein as shown at $d$. The inner ends of the pipe lengths in the finished coupling are spaced apart in order to provide room for further threading of the pipes into the sleeve when adjacent sections of the pipe line are to be turned for repair.

The coupling may be inserted into a pipe line of either the butt or spigot type, the ends of the inner pipes $b$ being welded to the ends of the adjacent pipe line sections as shown at $e$ when the pipe line is of the butt type, and the ends of the sleeve $a$ being welded to the adjacent ends of the pipe line as shown at $f$ when the pipe line is of the spigot type in which case the inner tube of the coupling will be inserted into the adjacent end of the pipe line.

When one section of the pipe line adjacent the coupling is to be turned for repair the coupling sleeve at the reduced part adjacent the pipe line section is parted as shown at $g$ by a V pointed lathe type tool or by chain and wheel cutter or by other suitable means, the recess upon the inside of the coupling sleeve being provided to permit of this parting operation without damage to the inner pipe or tube.

When the parting has been completed the adjacent section of pipe line may be turned and preferably the parting cut is made to give a minimum gap $g'$ equal to the thread pitch of the pipe $b$ in the sleeve so that the pipe line may be given a full turn during which the coupling tube $b$ will be threaded further into the sleeve. Thereafter the cut in the sleeve is made good by welding as shown at $h$ and the arrangement is such that the coupling may be cut and re-welded several times.

The welding $d$ of the sleeve to the coupling pipe lengths by the manufacturer enables the gap between the inner ends of the pipe lengths to be checked by the manufacturer and thereafter the joint may be inserted into a line without any special control being necessary at the site to ensure the necessary gap being left to enable future turning of the pipe line sections to be effected.

A construction in accordance with the invention provides for adequate protection of the threading against corrosion and ill-usage so that the coupling will always be in perfect condition for use even after prolonged exposure during service.

It will be understood that the invention extends broadly to the use of a coupling in a pipe line which enables a length of such pipe line to be turned relatively to an adjacent length without interrupting the supply through the pipe line and without any loss of fluid therefrom during the turning operation, and the invention therefore is not to be limited to the foregoing details of construction which are given by way of example only.

One obvious modification that may be made would be to provide the coupling with a single inner tube only and a sleeve recessed for parting near its one end instead of having the duplicated arrangement hereinbefore described.

I claim:

1. A coupling adapted to be welded into a pipe line comprising a sleeve and an inner length of pipe threaded thereinto in a fluid-tight manner, a welded joint connecting the sleeve and length of pipe the sleeve being recessed internally for a portion of its length so that the reduced portion thus formed may be parted by a suitable cutting tool after which the adjacent pipe length may be turned without breaking the threaded connection and the parting in the sleeve subsequently made good by welding.

2. A coupling according to claim 1 in which there is a length of pipe threaded into the sleeve from each end and the sleeve is recessed near each outer end.

3. A coupling according to claim 1 in which the fluid-tight connection is obtained by a soft metal washer inserted in a groove in the sleeve between the ends of the threaded portion thereof, and threaded into engagement with the inner pipe by the screwing of the latter into the sleeve.

4. A coupling according to claim 1 in which the fluid-tight connection is obtained by a soft metal washer inserted in a groove in the sleeve between the ends of the threaded portion thereof, and in which the inner end of the inner length of pipe is tapered so as to wedge the washer into its groove as the length of pipe is screwed into the sleeve.

5. In combination, a length of pipe having external threads at an end portion thereof, a sleeve surrounding the pipe and having internal threads in threaded engagement with the threads of the pipe, a welded joint securing an end of the sleeve to the pipe, said sleeve being provided intermediate the ends of its threaded portion with an internal annular groove, a packing filling the groove and engaging the threads of the pipe, the sleeve being provided between said groove and said end with an annular portion of reduced thickness to facilitate severing said end portion of the sleeve.

FREDERICK ROBERT KELLY.

REFERENCES CITED

The following references are of record in the file of this patent:

UNITED STATES PATENTS

| Number | Name | Date |
| --- | --- | --- |
| 670,584 | Fowle | Mar. 26, 1901 |
| 2,349,792 | Rosenblad | May 23, 1944 |
| 1,287,934 | Farnsworth | Dec. 17, 1918 |
| 2,187,217 | Winslow | Jan. 16, 1940 |
| 324,598 | Shelton | Aug. 18, 1885 |
| 326,469 | Youngs | Sept. 15, 1885 |

FOREIGN PATENTS

| Number | Country | Date |
| --- | --- | --- |
| 600,031 | German | Aug. 6, 1934 |
| 120,595 | Swiss | May 27, 1925 |